United States Patent [19]

Robertson et al.

[11] Patent Number: 4,581,338

[45] Date of Patent: Apr. 8, 1986

[54] PREPARATION OF CATALYST SUPPORTS AND MATERIALS PRODUCED THEREBY

[75] Inventors: John S. Robertson; Mildred M. LiPuma, both of Littleton; Stephen E. Gross, Lakewood, all of Colo.

[73] Assignee: Manville Service Corporation, Denver, Colo.

[21] Appl. No.: 740,121

[22] Filed: May 31, 1985

[51] Int. Cl.$^4$ .................. B01J 37/00; B01J 35/08
[52] U.S. Cl. .................. 502/8; 435/176; 436/527; 502/439
[58] Field of Search .................. 502/8; 435/176; 436/527

[56] References Cited

U.S. PATENT DOCUMENTS

| | | | |
|---|---|---|---|
| 2,898,304 | 8/1959 | Powell et al. | 502/8 |
| 3,666,627 | 5/1972 | Messing | 435/176 |
| 4,025,667 | 5/1977 | Tomb et al. | 435/176 X |
| 4,226,938 | 10/1980 | Yoshida et al. | 435/176 |

*Primary Examiner*—W. J. Shine
*Attorney, Agent, or Firm*—John D. Lister; Cornelius P. Quinn; Gregory A. Evearitt

[57] ABSTRACT

A process for the formation of a spherical catalyst support comprising the steps of:
(a) forming a mixture comprising:
  (i) 30–85 wt. % diatomite;
  (ii) 15–40 wt. % solvent;
  (iii) 0–15 wt. % fluxing agent; and
  (iv) 0–15 wt. % organic burnout material;
(b) forming said mixture into generally spherical balls;
(c) calcining said balls at a temperature in the range of about 700° to 2300° F. for about 10–45 minutes; and
(d) thereafter, depositing at least one catalytically active substance on the surface of said spherical support in any suitable manner.

The spherical support produced by the above process is especially useful as a support for immobilizing enzymes and microbial cells.

8 Claims, No Drawings

PREPARATION OF CATALYST SUPPORTS AND MATERIALS PRODUCED THEREBY

This invention relates to a process for the production of catalyst supports containing at least one catalytically active substance deposited thereon. It also relates to the catalyst supports produced by the above process.

The use of various substances to support, and in some instances immobilize, catalytically active materials is well known to those skilled in the art. Since catalytically active substances help to make reactions proceed which would otherwise not be thermodynamically possible or economically practical in many instances, it has become increasingly important to look for ways to efficiently utilize and maintain such catalytically active materials. Furthermore, since the cost of the catalytically active materials must itself be an active consideration in deciding whether to commercialize a process using the catalyst, there is even more reason to look at utilizing the catalyst as desirably as possible.

One of the most important classes of catalytically active materials or agents currently being studied and utilized in both theoretical and commercial settings are enzymes. It is known that enzymes, which are proteinaceous in nature and which are commonly water soluble, act as biocatalysts which serve to regulate many and varied chemical reactions which occur in living organisms. The enzymes may also be isolated and used in analytical, medical, and industrial applications. For example, they find use in industrial applications in the preparation of food such as cheese or bread as well as being used in the preparation of alcoholic beverages. The enzyme glucose isomerase is extensively used to convert glucose to fructose in the manufacture of high fructose corn syrup.

Since enzymes are commonly water soluble as well as being generally unstable and, therefore, subject to deactivation, they are difficult to remove for reuse from solutions in which they are utilized and they may not retain their catalytic activity over extended periods of time. These difficulties lead to an increased cost in the use of enzymes in commercial scale operations due to the necessity for frequent replacement of the enzyme. In order to reduce the high cost of enzyme replacement, various methods to immobilize enzymes prior to their use have been devised. This immobilization of the enzyme permits its reuse, whereas it might otherwise undergo deactivation or be lost in the reaction medium in which it is used. These immobilized enzyme systems may be employed in various reactor systems, for example, in packed columns and stirred tank reactors, depending on the nature of the substrate which is being biochemically reacted.

Apart from immobilization of enzymes themselves, various substances and techniques have been put forward by which the enzymes could be immobilized without isolation. In particular, whole cells of micro-organisms can be immobilized, thus using the microbial cell as a carrier for the enzyme and obviating the need for extraction of the enzyme from the cell.

One commonly used support or entrapment material for microbial cell immobilization is a gel, usually an alginate gel. Essentially the cells are trapped in a three-dimensional polymer network with relatively large interstitial spaces in the gel. The use of such gels has not been without problems though.

One problem with immobilizing microbial cells in a gel is their marked tendency to lose their activity during storage or other periods of non-use, for instance during transportation. An accompanying difficulty during non-use is the tendency for contaminating micro-organisms to proliferate. It is a relatively routine matter to prepare gel-immobilized cells which have high activity upon immediate use, but the activity tends to decay relatively quickly if the gel-immobilized microbial cells are not used. A basic disadvantage of gel is that it has a high water activity and probably provides a good environment for growth of contaminant molds, bacteria, and the like. Such gels, of course, are not reusable either.

Another type of material used to immobilize catalytic agents such as enzymes and microbial cells is a porous pellet composed primarily of a high silica content or mixtures of silica and alumina. The high silica content is derived from the addition of a high purity siliceous material to the reaction mixture in the process of making the pellet. On the porous surfaces of the pellets are deposited small amounts of the catalytically active agent.

In selecting such a porous, inorganic material to immobilize biological catalysts careful consideration must be given to the pore diameter of the carrier. Production rates are greatly affected by concentration of the enzymes or microbial cells and by the ease of diffusion to them. It has been generally recognized that maximizing the concentration of microbial cells and accepting the resulting diffusion rates gives the best performance. The highest loading of microbial cells are obtained when the pore diameters are based upon the microbial cell diameters. Pores which are one to five times the size of the largest microbial cell typically provide the highest production rates. In microbial cell immobilization, the pore diameters are based upon the major cell dimensions. Living systems require additional care to insure adequate space for cell reproduction.

A big disadvantage with the use of conventional high silica-based catalyst supports is that the average pore diameter is too small to accommodate microbial cells. Their typical average pore diameter is much less than 1 micron. Typically, diameters of 1 to 25 microns are needed to accommodate the microbial cells. Of course, when it becomes difficult to immobilize an effective number of microbial cells on a typical silica-based catalyst support, the economic attractiveness of such a support in commercial processes is greatly reduced.

One of the limitations encountered with the use of pelletized catalyst supports is that they do not always offer the greatest possible contact between the catalyst or other material immobilized or otherwise present on the pellet surface and the intended reactant. For example, a typical application of the pellets is their use as a catalyst support in a reactor bed or column. The reactor column or bed will be packed with pellets containing an enzyme immobilized on the surface of each pellet wherein the liquid reactant will be introduced into the top of the reactor bed or column. As the liquid reactant moves into contact with the pellets, a chemical reaction is supposed to take place. What can sometimes happen, though, is that the liquid reactant does not achieve a maximum intimate contact with the catalyst on the pellet. This is because the pellet shape does not lend itself to such maximum contact between catalyst and reactant. Additionally, the flow rate of the liquid reactant through a pelletized reactor column or bed is not always at its theoretical maximum either. Finally, when some pellets are placed in a reactor, their sharp edges rub against each other causing the production of fines which can plug up a reactor and thus cause the intended reaction to be hindered.

Because of the above limitations to both the gel, silica-based inorganic supports, and pelletized supports for immobilization of microbial cells, research was conducted to find a catalyst support which would overcome all the above disadvantages as well as offer other advantages. During the course of such research, it was discovered that an efficient catalyst containing support is made by the process of forming a mixture comprising a fluxing agent, an organic burnout material, a solvent, and diatomite, followed by forming the mixture into generally spherical balls then calcining the balls and thereafter depositing at least one catalytically active substance on the surface of the catalyst support in any suitable manner. By using the inventive process there is achieved a catalyst containing support with an average pore diameter of at least 4 microns. This contrasts sharply with the more conventional catalyst supports wherein the resulting average pore diameter is much smaller and therefore difficult to immobilize microbial cells on. Additionally, the general spherical supports allow for greater reactant-catalyst contact and reactant flow rate than do pelleted catalyst supports. Thus our invention results in the production of a more efficient catalyst containing support.

Our catalyst containing support also does not provide for an environment where a decline in microbial activity occurs and microbial contaminants proliferate as in the case of gels. Furthermore our supports are inert, rigid, and are reusable which greatly enhances their economic attractiveness. Additionally, our supports are made by an inventive process which employs economical ingredients and is easy to conduct.

Therefore, it is an object of the present invention to provide a novel process for the production of a spherical inorganic catalyst containing support.

It is another object of the present invention to provide a catalyst containing support made by the above novel process.

Other aspects, objects, and the several advantages of the present invention are apparent from the specification and the appended claims.

In accordance with one embodiment of the present invention we have discovered a novel process for the production of a spherical inorganic catalyst containing support. Our inventive process involves the steps of:
(a) forming a mixture comprising about:
 (i) 30–85 wt.% of diatomite;
 (ii) 15–40 wt.% solvent;
 (iii) 0–15 wt.% fluxing agent; and
 (iv) 0–15 wt.% organic burnout material;
(b) forming said mixture into generally spherical balls; and
(c) calcining said balls at a temperature in the range of about 700° to 2300° F. for about 10–45 minutes; and
(d) thereafter depositing at least one catalytically active substance on the surface of said balls by any suitable manner.

Preferably, the mixture in the inventive process will comprise 55–70 wt.% of the diatomite, 5–7 wt.% fluxing agent, 1–3 wt.% organic burnout material, and 25–35 wt.% solvent.

Diatomite is a chalky sedimentary material composed of the skeletal remains of single celled aquatic water plants called diatoms. Many modern diatomite deposits were laid down by sedimentation in shallow waters years ago. Subsequent geologic uplift has raised these beds to positions where they can be mined by conventional methods. Deposits are found in numerous parts of the world, with one of the largest and purest deposits being located on the central California coast. In other locations, there are currently shallow bodies of water where diatomite deposition has occurred and/or is currently occurring. Such deposits are presently mined by dredging. A typical dry diatomite analysis is shown in Table I below.

TABLE I

| Component | Wt. % |
| --- | --- |
| $SiO_2$ (a) | 86.0 |
| $Al_2O_3$ | 3.6 |
| $Fe_2O_3$ | 1.3 |
| Group I Oxides | 1.2 |
| Group II Oxides | 1.1 |
| Other | 0.5 |
| Water | 3.0 |
| Loss on Ignition | 3.6 |

Note:
(a) predominantly in amorphous form

Any commercially available solvent can be used in the present invention which will cause the mixture of the solid components to take on an extrudable consistency. These solvents may be organic or aqueous in nature however an aqueous solvent is presently preferred.

Examples of suitable organic solvents include but are not limited to kerosene, diesel fuels, and alcohols.

If used, the flux can be added as a solution dissolved in a spray or mixing water. Alternatively, dry flux powder can be incorporated into the mass of diatomite particles either during air conveying of the diatomite or by dry mixing of the flux and diatomite in conventional dry mixing devices such as blenders. Normally there will be from about 3 to about 10 weight percent flux based on the weight of the dry diatomite. Typical fluxes include alkali metal salts such as sodium carbonate ("soda ash"), sodium chloride, sodium hydroxide, and sodium silicate. Those skilled in the art will be well aware of the appropriate quantity of flux to use for any particular type of flux and diatomite.

Suitable organic burnout materials for optional use in the present invention include but are not limited to starches, cellulose fibers, corn meal, and powdered carbons. Examples of the cellulose fibers include kraft fiber, wood fiber, straw fibers, and others which are a well opened fiber. Short fiber lengths are preferred for ease in mixing and extruding.

After the mixture of the solids and solvent is formed, it is fed to a balling device.

The balling process and balling devices generally are described in Perry et al, *Chemical Engineers' Handbook* (5th edn., 1973), pages 8-61 to 8-64. The diatomite balling can be accomplished with any conventional type of balling device such as a balling disc or balling drum. A number of different types of balling devices are described in the literature and are commercially available in the marketplace. Their general configuration is shown in patents such as U.S. Pat. Nos. 3,140,326 and 3,206,528. Basically, balling discs are shallow cylindrical devices mounted at an acute angle to the horizontal and rotated about the cylindrical axis. The granulated materials are fed onto the surface of the rotating disc and roll down the surface of the disc as the disc rotates.

The rolling action causes the particles to collide with each other and agglomerate into larger granules. As the granules are continually turned and carried back to the top of the disc to be rolled down again, they form generally spherical shapes and gradually increase in diameter. Eventually they reach the desired size and are discharged over the lip of the disc. Balling drums are similar in operation but deeper and the material being balled slowly passes through the hollow drums and exits at the lower end. Commercial balling discs can be operated so as to produce a limited size range of spherical balls exiting from the disc. In the present invention, it has been found most satisfactory to have balls of approximately 0.2 to 6.0 mm diameter.

Following balling, the diatomite balls are conveyed to a calcination unit. This would preferably be a rotary kiln but may be a traveling grate, an externally heated tube furnace or fluidized bed.

Calcination temperatures in the range of about 700°–2300° F. for about 10–45 minutes, preferably at a temperature in the range of about 2000°–2200° F. for about 20–30 minutes are utilized in the present invention. The calcining time will normally be at least about 10 minutes and more on the order of about 20–30 minutes.

Calcining in an oxygen containing atmosphere should continue until all the organic burnout material, if any is present, has been burned out of the balls leaving a highly porous composite of diatomite. If desired, additional air injection can be made at approximately the mid-point of the calcination kiln to enhance the calcination; an air lance is quite suitable for such air injection. The balls can then be screened to remove off-size material.

After calcining, at least one catalytically active material is deposited onto the ball's surface in any suitable or conventional manner. For example, enzymes may be immobilized on the spherical surface with the use of a silane coupling agent.

In accordance with another embodiment of the present invention, an inorganic catalyst support having a pore diameter very suitable for immobilizing microbial cells is provided. This inorganic catalyst support is made by the above described inventive process.

The average pore diameter of the inventive catalyst support is at least about 8 microns. The resulting catalyst support has a mean pore diameter which is ideal for immobilizing microbial cells.

Generally, the inventive catalyst support will have a surface area in the range of about 0.5–5.0 m$^2$/g, a pore volume in the range of about 0.2–3.0 cc/g, and a crush strength of about 1–10 kg.

EXAMPLE

This example illustrates the preparation of an inventive catalyst support.

300 lbs. of natural diatomite (FILTER-CEL ® from Manville Products Corporation), 27 lbs. of milled soda ash, 3.3 lbs of a corn flour binder (No. 961 Mogul binder available from Illinois Cereal Mills, Inc.) and 6.98 gallons of water were placed in a blender and mixed together for about 10 minutes. The resulting mixture was then fed to a tilted balling disc the lip of which was set at a depth of 5 to 10 inches 0.175 to 0.2 gallons per minute of water was added to the disc and the disc rotated at a speed of 15–17.4 rpms. The resulting approximate production rate of wet spheres (32% moisture at discharge) was 4.8 lbs/min. The wet spheres were then transported to a kiln where they were calcined at 2050° F. Resonance time in the kiln is 20–30 minutes. The calcined balls were then cooled in an air stream. The physical measured properties of the pellets, useful as a support for immobilizing microbial cells, were as follows: mean pore diameter, 7.18 microns, pore volume, 1.55 cm$^3$/g; and crush strength 1.3 kg.

Reasonable modifications and variations are possible from the foregoing without departing from the spirit or scope of the present invention.

We claim:
1. A process for the formation of a spherical catalyst containing support comprising the steps of:
   (a) forming a mixture comprising:
      (i) 30–85 wt. % diatomite;
      (ii) 15–40 wt. % water;
      (iii) 0–15 wt. % sodium salt fluxing agent; and
      (iv) 0–15 wt. % starch;
   (b) forming said mixture into generally spherical balls;
   (c) calcining said balls at a temperature in the range of about 700° to 2300° F. for about 10–45 minutes; and
   (d) thereafter, depositing at least one catalytically active substance on the surface of said spherical support in any suitable manner.

2. A process according to claim 1 wherein the mixture in 1(a) comprises:
   (a) 55–70 wt. % diatomite;
   (b) 25–35 wt. % water;
   (c) 5–7 wt. % sodium salt fluxing agent; and
   (d) 1–3 wt. % starch.

3. A process according to claim 1 wherein said fluxing agent is soda ash.

4. A process according to claim 1 wherein said starch is corn flour.

5. A process according to claim 1 wherein said calcining is conducted at a temperature in the range of 2000° to 2200° F. for about 20–30 minutes.

6. A process according to claim 1 wherein said catalytically active substance is an enzyme or microbial cell.

7. A spherical catalyst containing support having deposited on the surface thereof at least one catalytically active substance made by the process of claim 1.

8. A spherical catalyst containing support having deposited on the surface thereof at least one catalytically active substance made by the process of claim 1 and having an average pore diameter of at least 8 microns.

* * * * *